United States Patent [19]

Grime et al.

[11] Patent Number: 4,722,673
[45] Date of Patent: Feb. 2, 1988

[54] TANK MOUNTING FOR COMPRESSOR AND MOTOR

[75] Inventors: Thomas E. Grime, Temperance, Mich.; Gary C. Kreutzer, Toledo, Ohio

[73] Assignee: Champion Spark Plug Company, Toledo, Ohio

[21] Appl. No.: 834,160

[22] Filed: Feb. 27, 1986

Related U.S. Application Data

[63] Continuation of Ser. No. 571,045, Jan. 12, 1984, abandoned.

[51] Int. Cl.⁴ ............................................. F04B 35/04
[52] U.S. Cl. .................................... 417/360; 417/362
[58] Field of Search .............. 417/362, 360, 363, 372, 417/234, 540, 313; 248/678; 141/2, 18

[56] References Cited

U.S. PATENT DOCUMENTS

| | | | |
|---|---|---|---|
| 1,566,067 | 12/1925 | Berkeley | 417/362 |
| 1,622,876 | 3/1927 | Leo | 417/372 |
| 1,730,319 | 10/1929 | Dilks | 417/362 |
| 1,776,786 | 9/1930 | Eisenhauer | 417/363 |
| 1,998,338 | 4/1935 | Spohrer | 417/363 |
| 2,036,098 | 3/1936 | Pieper et al. | 417/362 |
| 2,054,824 | 9/1936 | Knapp | 417/363 |
| 2,136,098 | 11/1938 | Browne | 417/362 |
| 2,367,607 | 1/1945 | Nicol | 417/362 |
| 2,559,980 | 7/1951 | McAllister | 417/362 |
| 2,605,044 | 7/1952 | Hill | 417/540 |
| 4,242,055 | 12/1980 | Felter | 417/362 |

FOREIGN PATENT DOCUMENTS

919265  12/1945  France ............................. 417/362

Primary Examiner—Randolph A. Reese
Assistant Examiner—Peter M. Cuomo
Attorney, Agent, or Firm—MacMillan, Sobanski & Todd

[57] ABSTRACT

Apparatus for mounting a compressor and a motor on an air receiving tank. One end of a compressor base is provided with legs which rest on the top of the tank and an opposite end of the compressor base is provided with a tongue which is connected to an adaptor on the tank. Preferably, the adaptor is a check valve which is threaded into a tank opening. The motor is attached to the compressor base adjacent the legs for pivoting towards and away from the compressor to maintain tension on a drive belt interconnecting the motor and the compressor. An optional ratchet mechanism restricts the motor to pivoting only away from the compressor to maintain a minimum tension on the drive belt.

15 Claims, 13 Drawing Figures

TANK MOUNTING FOR COMPRESSOR AND MOTOR

This is a continuation of co-pending application Ser. No. 571,045 filed on Jan. 12, 1984, now abandoned.

DESCRIPTION

1. Technical Field

This invention relates to an improved mounting for a compressor and drive motor and more particularly to an improved compressor and motor mounting which is attached to a threaded opening of an air receiving tank without welding to the tank.

2. Background Art

Portable and stationery air compressors are used for many applications including operating pressure feed tanks, spray guns, caulking guns, air brushes, sand blasters, pneumatic tools, inflating tires, etc. Air compressors for these applications generally comprise a cylindrical air receiving tank, a belt driven compressor and a motor. In prior art air compressors, a mounting platform typically is welded to the upper side of a horizontally oriented tank or to the top of a vertically oriented tank. The compressor and the motor are mounted on the platform and a drive belt interconnects pulleys on the motor and the compressor. The motor generally is bolted through slots in the mounting platform which allows for adjustment of the motor position towards and away from the compressor to adjust belt tension. Since the air receiving tank must withstand a high internal gas pressure, highly skilled welders are required for welding the mounting platform onto the tank to avoid weakening the tank at the welds. Also, in this prior art construction, tension on the drive belt applies bending forces to the mounting platform which in turn stress the tank at the welds. These stresses fluctuate with changes in the compressor load since both the motor and the compressor are rigidly bolted to separate locations on the mounting platform.

In a typical prior art air compressor, the pulley mounted on the compressor is of a considerably larger diameter than the pulley on the motor so that the compressor is driven at a much lower speed than the motor. In order to prevent belt slippage when the motor and the compressor are both rigidly attached to the mounting platform, a substantial spacing is required between the motor and the compressor to provide sufficient wrap of the belt around the small motor pulley.

DISCLOSURE OF THE INVENTION

The invention is directed to an air compressor having an improved mounting for attaching a compressor and a drive motor to an air receiving tank. An adaptor, which preferably includes a check valve, is attached to a threaded opening in the top of the tank for supplying compressed air to the tank. The compressor is provided with a base having a pair of legs at one end which terminate at resilient pads resting on the tank. A tongue projecting from the other end of the compressor base includes an opening which receives the tank adaptor. A nut is attached to threads on the tank adaptor to retain the compressor base tongue. Preferably, the tank adaptor includes an enlarged diameter spherical shoulder. The tongue is provided with a corresponding spherical lower surface which engages the adaptor shoulder and with a spherical upper surface which engages a corresponding spherical surface on the nut to allow limited rotational movement of the compressor base relative to the tank and adaptor to align the compressor base with the tank. In a modified mode, resilient bushings are placed on the adaptor to abut the tongue for allowing restricted movement of the compressor base relative to the tank and adaptor.

The motor is attached to the compressor base adjacent the legs for limited pivotal movement towards and away from the compressor. The weight of the motor exerts tension on a drive belt connecting a motor pulley to a compressor pulley. Also, the motor is driven in a direction which increases belt tension whenever the motor load increases. This increased belt tension under increased load permits locating the small diameter motor pulley quite close to the large diameter compressor pulley without the belt slipping under heavy load conditions.

In one mode of the air compressor, a ratchet mechanism is provided between the motor and the compressor or the compressor base to restrict pivotal movement of the motor towards the compressor while allowing the motor to pivot away from the compressor to increase belt tension. The ratchet mechanism maintains tension on the belt in the event that the portable air compressor is picked up by the motor or is accidently tipped on its side. In addition, the ratchet mechanism maintains a minimum tension on the belt during operation of the motor.

BEST MODES FOR CARRYING OUT THE INVENTION

Figure 1:
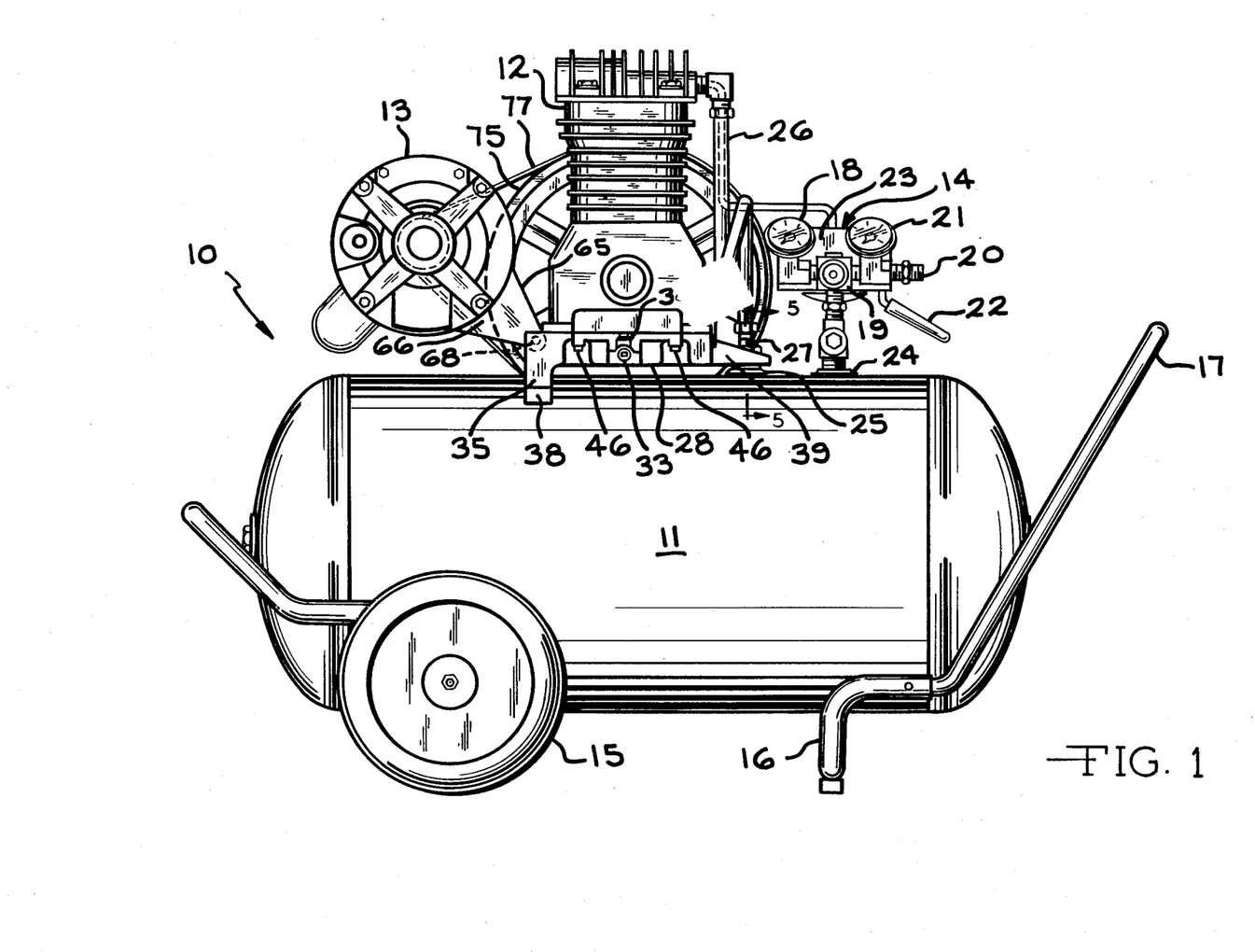
FIG. 1 is a front side elevational view of a portable air compressor including an air receiving tank with a belt driven compressor and motor mounted thereon in accordance with the present invention.
Figure 2:
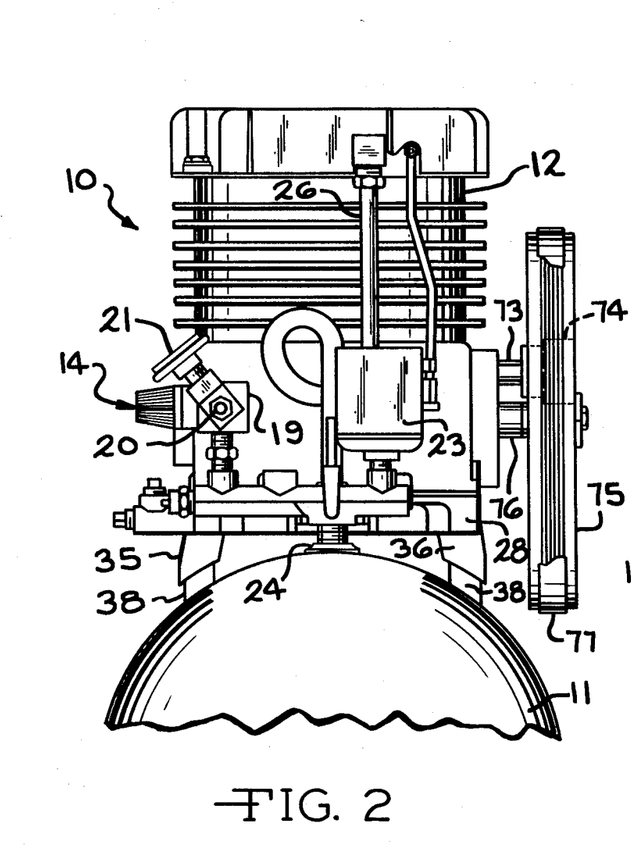
FIG. 2 is a fragmentary end elevational view of the portable air compressor of FIG. 1.
Figure 3:
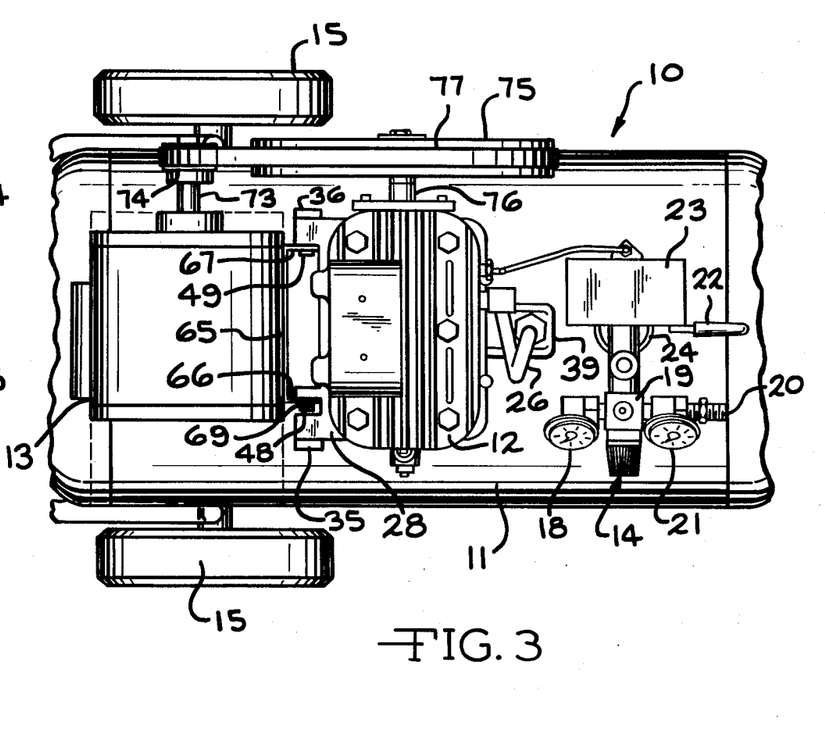
FIG. 3 is a fragmentary top plan view of the portable air compressor of FIG. 1.

Turning now to the drawings and particularly to FIGS. 1-3, a portable air compressor 10 is illustrated in accordance with one embodiment of the invention. The air compressor 10 generally includes an air receiving tank 11, a compressor 12, a motor 13 and controls 14. The illustrated tank 11 is supported at one end by a pair of wheels 15 and at an opposite end by a tubular leg 16. A handle 17 is attached to the leg 16 to facilitate moving the portable air compressor 10.

Reference number 14 generally refers to conventional air compressor "controls" which may include any one or more of the following: a gauge 18 for indicating the pressure within the air receiving tank 11, a pressure regulator 19 for controlling the pressure at a compressed air outlet 20, a gauge 21 for indicating the gas pressure at the outlet 20, an outlet valve 22 and a pressure responsive switch 23 for turning the motor 13 on and off. The controls 14 are attached to a threaded flange 24 which is welded to an opening in the air receiving tank 11.

A second threaded flange 25 is welded to the tank 11. The compressor 12 supplies compressed air to the tank 11 through a tube 26 and an adaptor 27 which threadably engages the flange 25. Preferably, the adaptor 27 includes a check valve which allows unloading the outlet from the compressor 12 without loss of pressure within the tank 11. The outlet pressure on the compressor 12 is unloaded when the motor 13 stops to facilitate restarting of the motor 13. The adaptor 27 also functions as an attachment point for connecting to the tank 11 a base 28 which supports the compressor 12 and the motor 13.

Figures 4, 5:
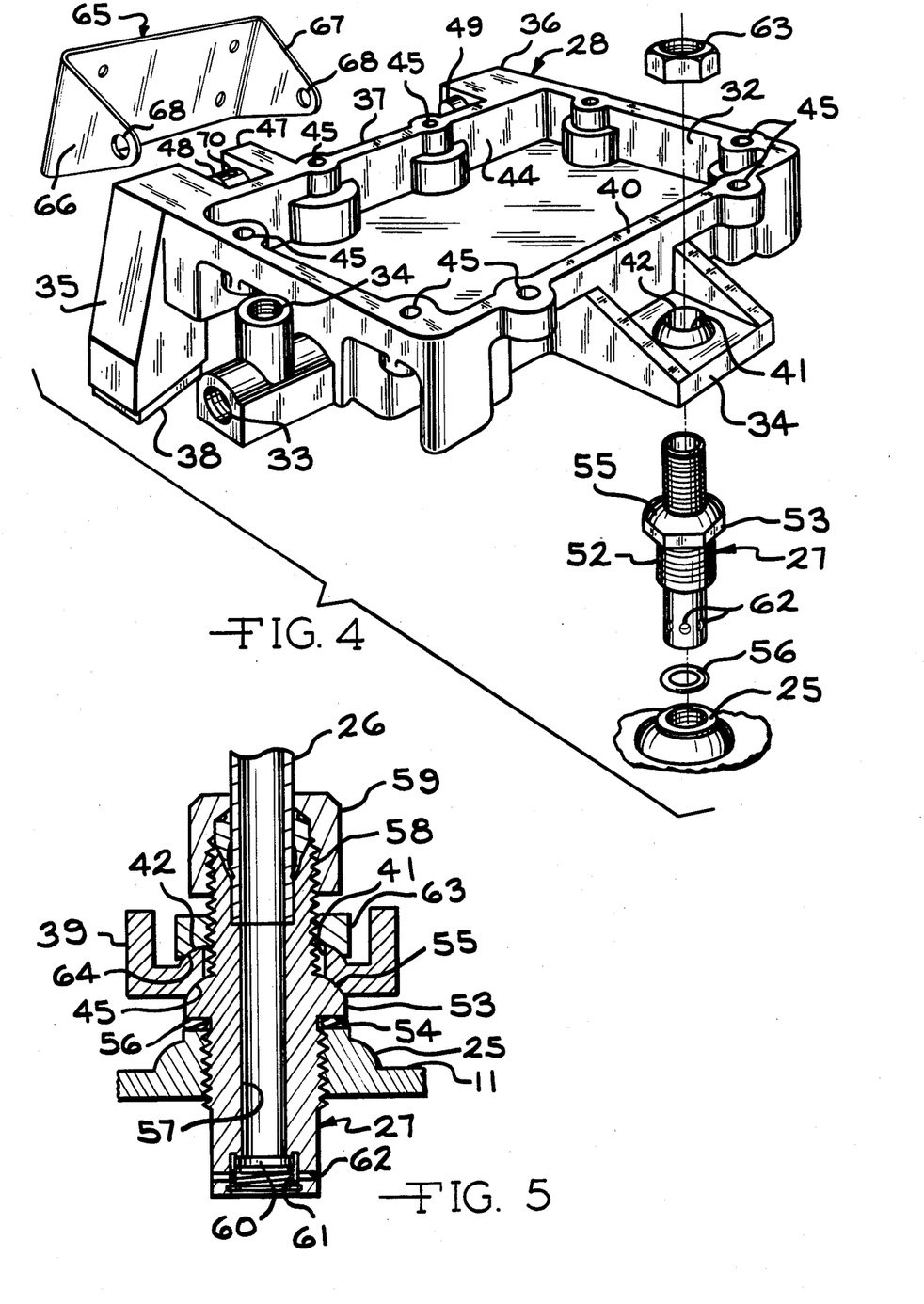
FIG. 4 is an exploded perspective view of tank mounting for a belt driven compressor and motor constructed in accordance with the present invention.
FIG. 5 is an enlarged cross sectional view taken along line 5—5 of FIG. 1.

Turning now to FIG. 4, details are shown for the base 28. Although the base 28 may be totally separate from and simply bolted to a closed bottom on the compressor 12, preferably, the base 28 is a casting which encloses the bottom of the compressor and defines an oil sump 32. An oil drain opening 33 and an oil fill opening 34 are connected with the sump 32. Two legs 35 and 36 extend downwardly from opposite corners at one end 37 of the base 28. The legs 35 and 36 are terminated at their lower end with pads or feet 38 which preferably are of a resilient material such as a rubber. When the base 28 is attached to the air receiving tank 11, the pads 38 rest against the upper surface of the tank 11. It should be noted that one size base 28 may be used for mounting the compressor 12 and motor 13 on different diameter air receiving tanks simply by changing the dimensions of the pads 38.

The base 28 has a wall 44 extending around and enclosing the sump 32. A number of vertically oriented openings 45 are located within the wall 44 for receiving bolts 46 (see FIG. 1) for attaching the compressor 12 to the base 28. Between the legs 35 and 36 and adjacent the leg 35, a flange 47 projects outwardly from the wall 44. A short pin 48 projects from the flange 47 towards the upper end of the leg 35 and a pin 49 projects from the upper end of the leg 36 towards the upper end of the leg 35. The pins 48 and 49 are aligned on the same axis for supporting the motor 13, as will be discussed in greater detail below.

A tongue 39 extends outwardly from the center of a base end 40 opposite the base end 37. The tongue 39 defines an opening 41 for attaching to the adaptor 27. As best illustrated in FIG. 5, upwardly directed spherical upper and lower surfaces 42 and 43, respectively, are formed in the tongue 39 conscentric with and adjacent the opening 41.

FIGS. 4 and 5 show details of the adaptor 27 and the manner in which the base 28 is connected to the tank 11 by means of the adaptor 27. The adaptor 27 is generally tubular in shape and includes a threaded portion 52 which engages a correspondingly threaded opening in tank flange 25. Immediately above the threaded portion 52 is an enlarged diameter hexagonal shoulder 53 having a flat annular lower surface 54 and a spherical upper surface 55. The shoulder 53 is adapted to receive a suitable wrench for installing and removing the adaptor 27 from the tank 11. When installing the adaptor 27, a gasket 56 is positioned between the lower shoulder surface 54 and the flange 25 for preventing leakage of compressed air.

The adaptor 27 has a central opening 57 extending therethrough. The adaptor 27 has an upper threaded end 58 which receives a suitable threadable tube fitting 59 for connecting the tube 26 to the adaptor 27. Preferably, the adaptor 27 includes a check valve, such as a valve member 60 and a spring 61 for allowing compressed air to flow from the tube 26 through the adaptor opening 57 and through outlet openings 62 into the interior of the tank 11 while preventing a reverse air flow.

In attaching the base 28 to the tank 11, the base tongue opening 41 is positioned over the threaded check valve end 58 so that the lower spherical tongue surface 45 rests against the corresponding spherical upper surface 55 on the adaptor shoulder 53. A nut 63 is threaded onto the adaptor end 58 so that a lower spherical surface 64 on the nut 63 contacts the corresponding upper spherical surface 42 on the base tongue 39. The spherical surfaces 55, 45, 42 and 64 allow limited pivotal movement of the base 28 relative to the adaptor 27 and the tank 11 during assembly of the air compressor 10. This movement compensates for normal manufacturing tolerances and allows the base 28 to align with the tank 11 with the feet 38 on both legs 35 and 36 in contact with the tank 11. While the base 28 is allowed to move slightly relative to the tank 11 during assembly, it is retained in place by means of the nut 63 and the adaptor 27. Alternatively, resilient bushings may be positioned on the adaptor 27 abutting the tongue 39 to allow limited movement of the base 27 relative to the adaptor 27 and the tank 11.

Referring now to FIGS. 1-4 and 6, the method for attaching the motor 13 to the base 28 is illustrated. A bracket 65 is bolted or otherwise attached to the motor 13. The bracket 65 is provided with two spaced, parallel arms 66 and 67, each of which defines an opening 68 for receiving the base pins 48 and 49, respectively. The arms 66 and 67 are spaced to receive the pins 48 and 49 when the motor 13 is attached to the base 28. After the bracket 65 is positioned on the pins 48 and 49, a clip 69 (FIG. 3) may be inserted through an opening 70 in the pin 48 to retain the motor 13 on the base 28 while allowing the motor 13 to pivot about the axis of the pins 48 and 49. The motor 13 includes an output shaft 73 on which a small diameter pulley 74 is mounted. A considerably larger diameter pulley 75 is mounted on an input shaft 76 on the compressor 12. A belt 77 interconnects the pulleys 74 and 75.

Figure 6:
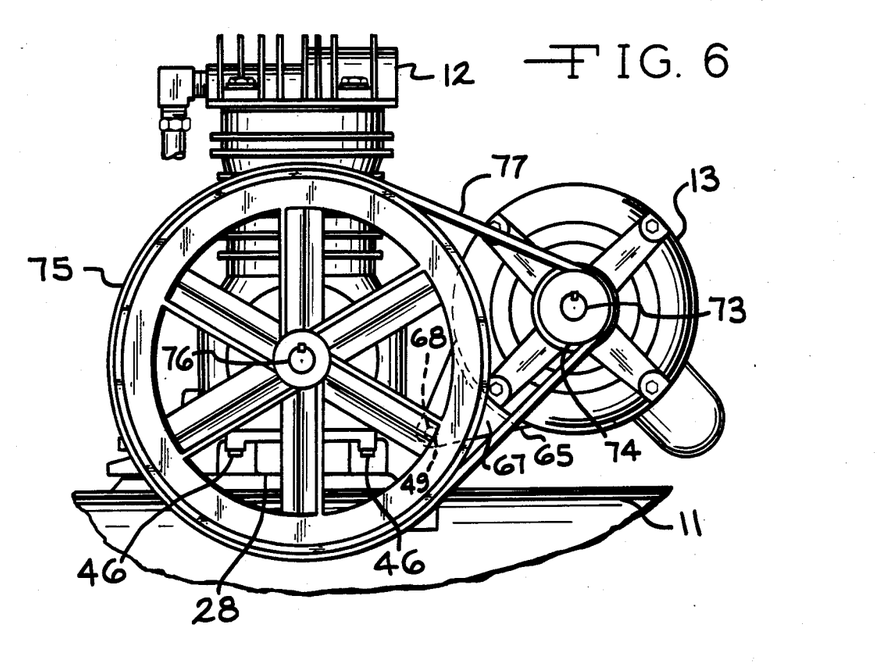
FIG. 6 is a fragmentary rear side elevational view of the portable air compressor of FIG. 1.

Referring to FIG. 6, it will be noted that the axis of the pins 48 and 49 about which the motor 13 pivots is located below and to one side of the motor. As a consequence, the weight of the motor tends to pivot the motor downwardly to place tension on the belt 77. It also will be noted from FIG. 6 that since the compressor pulley 75 is considerably larger than the motor pulley 74 and the pulleys 74 and 75 are located relatively close together, the belt 77 has only a limited wrap about the motor pulley 74. This arrangement violates the standard engineering rules for motor pulley size and shaft spacing between a motor and a compressor. Belt slippage is avoided by locating the axis of the pins 48 and 49 about which the motor 13 pivots beneath and to one side of the motor, adjacent the base end 37 and preferably to extend within the confines of the path of the belt 77. In addition, the motor 13 is driven in a counter-clockwise direction, as viewed in FIG. 6. As a consequence, when the compressor load increases, tension will increase in the portion of the belt 77 extending from the bottom of the motor pulley 74 to the bottom of the compressor pulley 75. This increase tension in the lower portion of the belt 77 further tends to pivot the motor 13 away from the compressor 12 to simultaneously increase the tension in the top portion of the belt 77 and thereby prevent belt slippage. Consequently, the drive arrangement between the motor 13 and the compressor 12 is self-tensioning. At the same time the belt is self-tensioning, the motor 13 is allowed to pivot as necessary, to respond to the cyclic peak loads on the compressor 12. This self-tensioning feature minimizes the generation of vibration as the compressor 12 is driven by the motor 13.

It also will be appreciated that any vibrations and noise which are generated will be at a lower amplitude than that present in prior art air compressor systems in which the compressor and the motor are individually bolted to a mounting platform which is in turn welded to the air receiving tank. These vibrations were transferred directly through the mounting platform to the air receiving tank. In the air compressor 10, the motor and the compressor are connected together, resulting in a lower amplitude vibration transferred to the air tank since the vibration amplitude is determined in part by the combined mass of the motor and the compressor. Furthermore, the resilient pads 38 reduce the transmission of vibrations from the mounting base 28 to the air receiving tank, resulting in a much quieter operation. It also should be noted that in prior art compressors, stresses were sometimes transferred through the mounting platform to the welds connecting the mounting platform to the air receiving tank. These stresses were caused by the fact that the motor and the compressor were individually attached to the mounting platform. Loads on the drive belt apply reaction forces through the motor and the compressor to mounting platform. Stresses of this type are not transferred to the air receiving tank 11 by the base 28 since the motor 13 is free to pivot relative to the compressor 12 and there is only a single attachment point to the air receiving tank 11.

Figure 7:
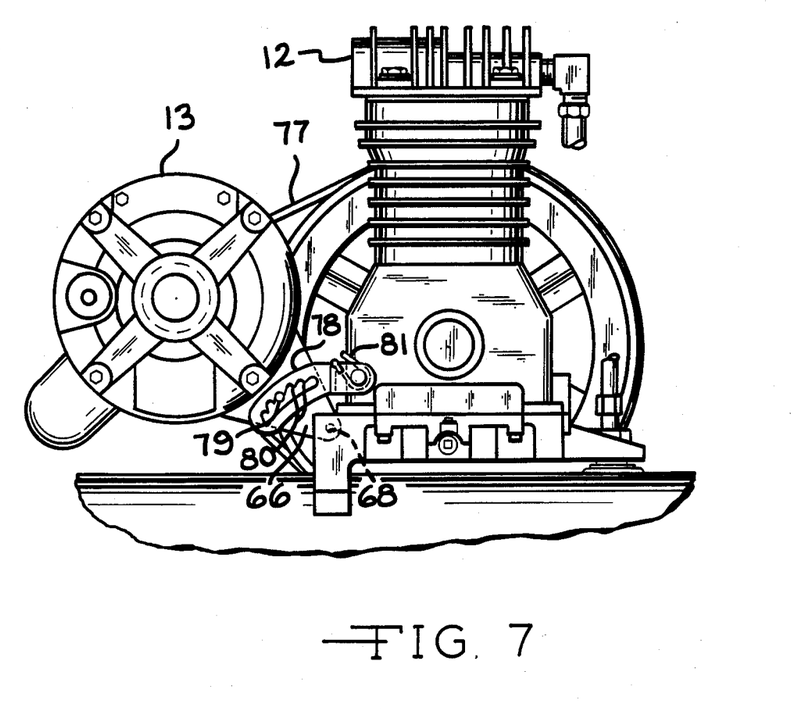
FIG. 7 is a fragmentary front side elevational view of a portable air compressor illustrating a compressor and a motor mounted on an air receiving tank in accordance with a modified embodiment of the invention.
Figure 8:
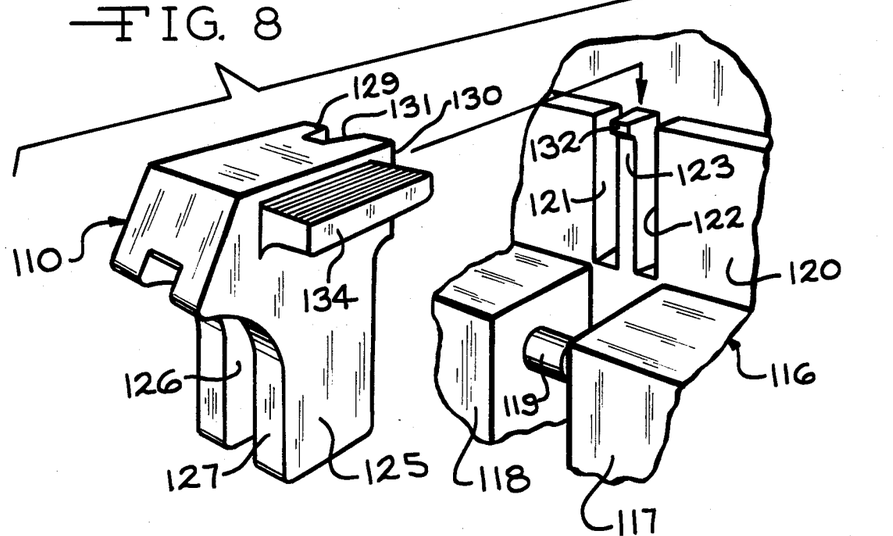
FIG. 8 is an enlarged fragmentary perspective view illustrating a modified embodiment of a ratchet mechanism for restricting rotation of the motor relative to the compressor.
Figure 9:
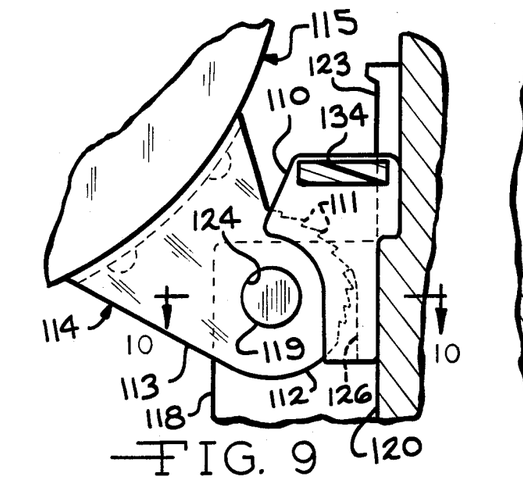
FIG. 9 is a cross sectional view taken along line 9—9 of FIG. 10 and showing the ratchet mechanism of FIG. 8.
Figure 10:
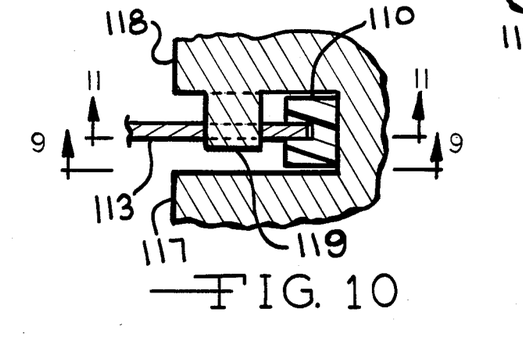
FIG. 10 is a cross sectional view taken along line 10—10 of FIG. 9.
Figure 11:
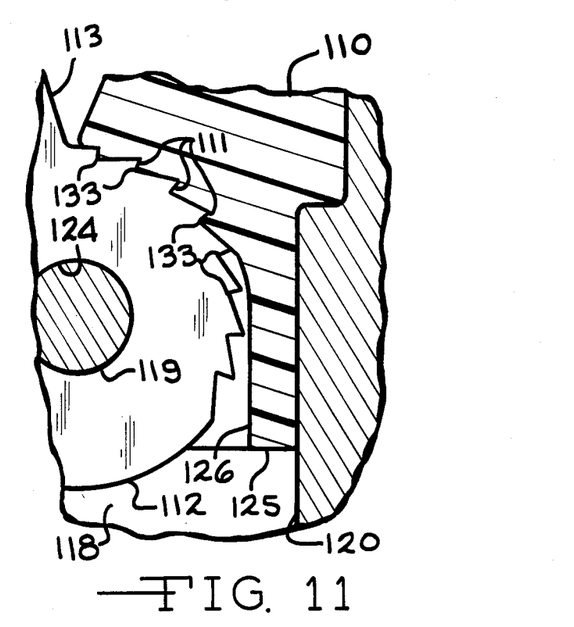
FIG. 11 is a cross sectional view taken along line 11—11 of FIG. 10.

Turning now to FIG. 7, an optional ratchet 78 and pin 79 mechanism are shown for restricting pivotal movement of the motor 13 relative to the compressor 12. The ratchet 78 includes a plurality of inclined teeth 80 into which the pin 79 may move as the motor 13 is pivoted away from the compressor 12. A spring 81 is provided for pivoting the ratchet 78 to maintain the pin 79 within the spacing between the teeth 80. The ratchet 78 and the pin 79 function to prevent the motor 13 from pivoting towards the compressor 12 in the event that an operator attempts to use the motor 13 as a handle for picking up the portable air compressor 10 or in the event that the portable air compressor 10 is accidentally tipped on its side. As a consequence, tension on the belt 77 cannot be accidentally removed to allow the belt 77 to fall from the pulleys 74 and 75. The ratchet mechanism also maintains a minimum belt tension greater than that achieved through the weight of the motor 13. Normally, maximum motor torque occurs when the motor is first started. At this time, the motor pivots or dips slightly to increase the belt tension. At the same time, the pin 79 will engage a different tooth 80 on the ratchet 78. When the motor torque is reduced, the pin 79 will remain in this new ratchet tooth 80 to maintain a minimum belt tension which is not dependent on motor weight, belt length, etc.

Turning now to FIGS. 8-11, a further modified ratchet mechanism is illustrated in the form of a shoe 110 which engages teeth 111 on a circular edge 112 on an arm 113 of a bracket 114 which is attached to a motor 115. A motor and compressor mounting base 116 includes a leg 117, a flange 118 and a pin 119 which are similar to the leg 35, flange 47 and pin 48 on the base 28 of FIG. 4. The base 116 also includes a generally vertical sidewall 120. Two spaced, parallel grooves 121 and 122 are formed within the wall 116 to define a guide 123 located between and above the leg 117 and the flange 118.

In attaching the motor 115 to the base 116, the bracket 114 is positioned so that the pin 119 extends through an opening 124 which is conscentric with the arm edge 112. The shoe 110 has a lower end 125 which fits between the pin 119 and the base wall 120 and substantially fills the width of the space between the leg 117 and the flange 118. A groove 126 is formed within a side 127 of the shoe 110 to extend upwardly from the lower end 125. The groove 126 is adapted to receive and capture the bracket arm 113 to retain the bracket arm 113 on the pin 119.

The shoe 110 has a side 128 which abuts the base wall 120. Two guides 129 and 130 project from an upper portion of the side 127 for engaging the base grooves 121 and 122, respectively. The guide 123 on the base 116 fits within a groove 131 which extends on the shoe 110 between the shoe guides 129 and 130. Accordingly, the grooves 121 and 122 and the guide 123 on the base 116 and the mating guides 129 and 130 and groove 131 on the shoe 110 confine the shoe 110 to vertical movement along the base wall 120. A stop 132 formed on the top of the guide 123 retains the shoe 110 on the base 116.

A series of teeth 133 are formed on the shoe 110 within an upper portion of the notch 126 for engaging teeth 111 on the motor bracket arm 113. The teeth 133 on the stop 110 cooperate with the teeth 111 on the motor bracket arm 113 for allowing the motor 115 to pivot away from a compressor mounted on the base 116, or on a counter-clockwise direction as viewed in FIGS. 9 and 11. As the motor 115 is pivoted, the teeth 111 will rotate and engage different teeth 113 on the stop 110 until the belt interconnecting the motor 115 and a compressor on the base 116 is tight. As different pairs of teeth step into engagement, the stops 110 will rise and fall through gravity to maintain the pairs of teeth 111 and 133 in contact. Once the belt is tightened, the teeth 111 and 133 cooperate to prevent a reverse movement of the motor 115 and release the tension on the belt. When it is necessary to release tension on the belt, an operator simply lifts the stop 110 by means of a knob 134 and pivots the motor 115 in a clockwise direction, as viewed in FIGS. 9 and 11. Accordingly, it will be seen that the stop 110 replaces the clips 69 of FIG. 3 which retains the motor bracket on the pins 48 and 49 and the ratchet mechanism of FIG. 7 which restricts pivotal movement of the motor 13.

Figure 12:
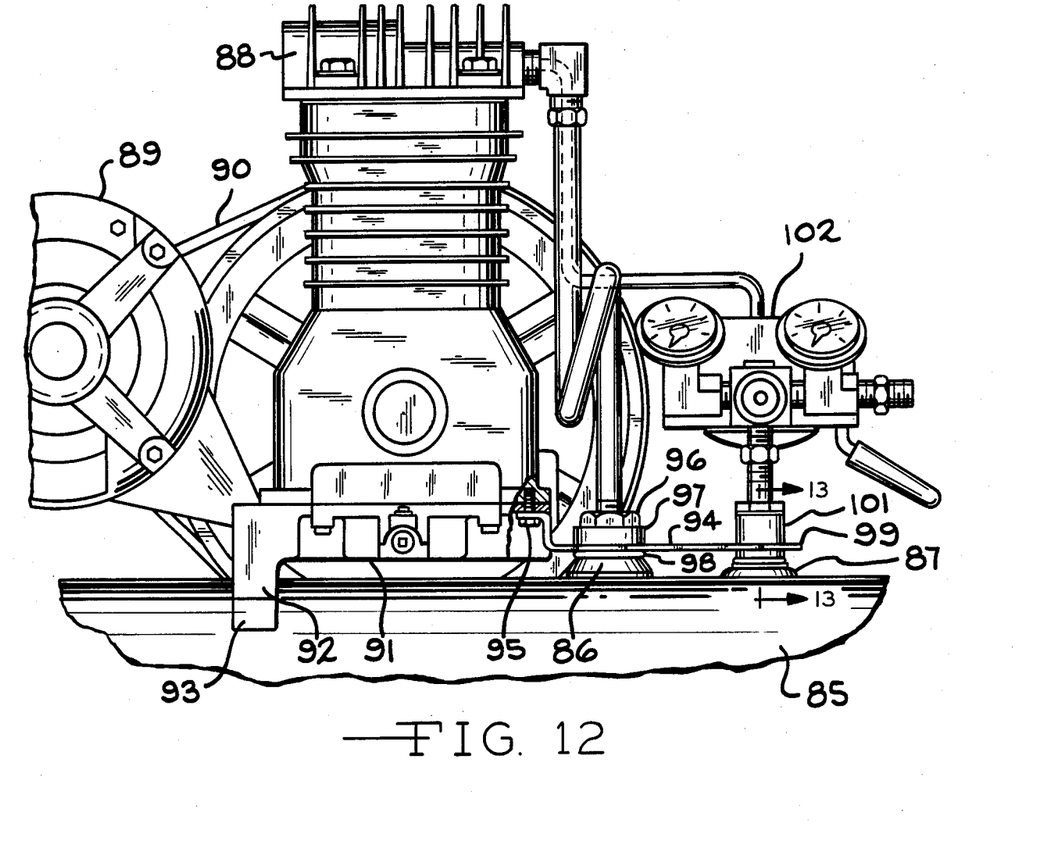
FIG. 12 is a fragmentary front side elevational view of a portable air compressor illustrating a compressor and a motor mounted on an air receiving tank in accordance with another modified embodiment of the invention.
Figure 13:
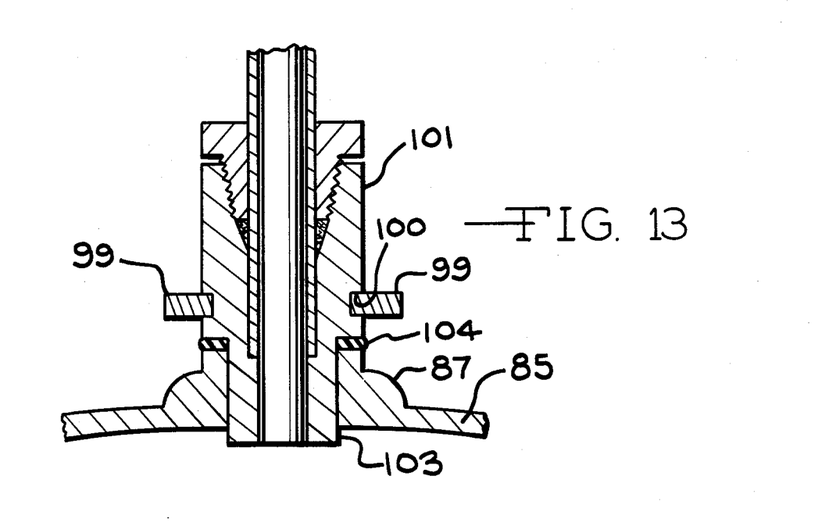
FIG. 13 is a cross sectional view taken along line 13—13 of FIG. 12.

Turning to FIGS. 12 and 13, a fragmentary view is shown of a portable air compressor 84 comprising a modified mode for carrying out the invention. The compressor 84 includes an air receiving tank 85 having a threaded air inlet flange 86 and a smooth bore air outlet flange 87. A belt driven compressor 88 and a motor 89 are interconnected by means of a drive belt 90 and are supported on a mounting base 91 in a manner similar to that in which the compressor 12 and motor 13 are supported on the base 28. The base 91 has a pair of legs 92 which rest through pads 93 on the tank 85, similar to the legs 35 and 36 and the pads 38 on the mounting base 28. The base 91 differs from the base 28 in that a separate tongue 94 is attached to the base 91 by means of bolts 95. The tongue 94 is attached to the tank 85 by means of an adaptor 96 which passes through a resilient bushing 97, the tongue 94 and a resilient bushing 98 and engages the tank flange 86. The tongue 94 has an extended forked end 99 which engages a slot 100 in a fitting 101 to which controls 102 are connected. The fitting 101 has a smaller diameter lower end 103 which passes thorugh a gasket 104 and into the bore of the air tank flange 87. The tongue 94 exerts sufficiently downward pressure on the fitting 101 to retain the controls 102 on the tank 85 without air loss between the flange 87 and the fitting 101. This arrangement for attaching the instruments 102 to the tank 85 eliminates the need for clearance between the controls 102 and the compressor 88 to screw the gauges into a tank flange.

Different aspects of the above described preferred modes of the invention may be used individually. For example, it will be appreciated that a base such as the base 28 may be used for mounting a compressor on an air receiving tank without attaching the motor to the compressor. Or, a different method may be used for attaching the motor to the compressor, for example, the motor may be rigidly mounted on the compressor and directly drive the compressor. In addition, it will be understood that the method and apparatus described for mounting the motor on the base 28 may be used for mounting a motor on a conventional compressor, pump or other load without attachment to an air receiving tank. The drawings and particularly FIGS. 1–3, 6, 7 and 12 illustrate the compressor driven by a standard electric motor. It will be appreciated that other types of motors may be used for driving the compressor, such as a conventional internal combustion engine. Such engines may be attached to the base 28 in the same manner in which the motor 13 is attached to the base 28. Other changes and modifications to the above described preferred modes will be apparent to those skilled in the art without departing from the spirit and scope of the following claims.

We claim:

1. Apparatus for mounting a compressor and a motor on an air receiving tank, the compressor having a compressed air outlet, comprising an air handling adaptor attached to the tank and having a threaded tubular end projecting above the tank, said tubular end defining a central opening communicating with the interior of the tank, a base having first and second opposite ends with leg means extending downwardly from said first base end said leg means resting directly on the tank to support said first base end, flange means on said second base end for attaching said second base end to said projecting threaded adaptor end whereby said base rests on and has a single point of attachment to said tank, means rigidly attaching the compressor to said base, means mounting the motor on said base, means connecting the motor to drive the compressor, and means connecting the compressor outlet to said adaptor end.

2. Apparatus for mounting a compressor and a motor on an air receiving tank, as set forth in claim 1, wherein said adaptor threadably engages an upwardly directed internally threaded opening in said tank.

3. Apparatus for mounting a compressor and a motor on an air receiving tank, as set forth in claim 2, wherein said adaptor includes an integral check valve for preventing air flow from the tank to the compressor.

4. Apparatus for mounting a compressor and a motor on an air receiving tank, as set forth in claim 1, wherein said base encloses an open bottom on the compressor to define a compressor oil sump.

5. Apparatus for mounting a compressor and a motor on an air receiving tank, as set forth in claim 1, wherein said base is an integral part of the compressor.

6. Apparatus for mounting a compressor and a motor on an air receiving tank, as set forth in claim 1, wherein said flange means attaching said base to said projecting adaptor end includes a tongue extending from said second base end defining an opening through which said projecting adaptor end extends, and means attaching said tongue to said projecting adaptor end for limited movement between said base and the tank to allow said leg means to align with and engage the tank.

7. Apparatus for mounting a compressor and a motor on an air receiving tank, as set forth in claim 6, wherein said leg means includes a resilient pad for engaging the tank.

8. Apparatus for mounting a compressor and a motor on an air receiving tank, as set forth in claim 7, wherein said means for attaching said tongue to said projecting adaptor end includes resilient means positioned on said adaptor end above and below said tongue, and nut means threadably engaging said threaded portion of said adaptor end for retaining said resilient means and said tongue on said adaptor end.

9. Apparatus for mounting a compressor and a motor on an air receiving tank, as set forth in claim 8, wherein said tank includes an air outlet located adjacent said adaptor, and wherein said tongue includes means for holding controls in such air outlet.

10. Apparatus for mounting a compressor and a motor on an air receiving tank, as set forth in claim 1, wherein said means mounting the motor on said base includes means pivotally attaching the motor to said first base end with the motor located substantially above and to one side of the axis of pivot for pivoting the motor towards and away from the compressor, the motor pivoting through its own weight to maintain tension on a drive belt interconnecting the motor and the compressor.

11. Apparatus for mounting a compressor and a motor on an air receiving tank, as set forth in claim 10, and further including releasable means for preventing the motor from pivoting towards the compressor while allowing the motor to pivot away from the compressor to increase belt tension.

12. Apparatus for mounting a compressor and a motor on an air receiving tank, the compressor having a compressed air outlet, comprising an air handling adaptor attached to the tank and having a threaded tubular end projecting above the tank, said tubular end defining a central opening communicating with the interior of the tank, a base having first and second ends with leg means extending downwardly from said first base end, said leg means including a resilient pad resting on the tank to support said first base end, means attaching said second base end to said projecting threaded adaptor end whereby said base rests on and has a single point of attachment to said tank, said attaching means including a tongue extending from said second base end defining an opening through which said projecting adaptor end extends, and means attaching said tongue to said projecting adapter end for limited movement between said base and the tank to allow said leg means to align with and engage the tank, means rigidly attaching the compressor to said base, means mounting the motor on said base, means connecting the motor to drive the compressor, means connecting the compressor outlet to said adaptor end, and wherein said adaptor includes an enlarged diameter shoulder having an upwardly directed spherical surface, wherein said base tongue has a lower spherical surface surrounding said opening for engaging said spherical adaptor surface and has a correspondingly shaped upper spherical surface surrounding said opening, and wherein said means for attaching said tongue to said adaptor end includes a nut threadably engaging said adaptor end, said nut having a lower spherical surface engaging the upper spherical surface on said tongue, whereby said base aligns with the leg means resting on the tank.

13. Apparatus for mounting a compressor and a motor on an air receiving tank, the compressor having a compressed air outlet, comprising an air handling adaptor attached to the tank and having a threaded tubular end projecting above the tank, said tubular end defining a central opening communicating with the interior of the tank, means connecting the compressor outlet to said adaptor end, a base having first and second ends with leg means extending downwardly from said first base end, said leg means resting on the tank to support said first base end, means attaching said second base end to said projecting threaded adaptor end whereby said base rests on and has a single point of attachment to said tank, means rigidly attaching the compressor to said base, means mounting the motor on said base a drive belt connecting the motor to drive the compressor, said means mounting the motor on said base including means pivotally attaching the motor to said first base end with the motor located substantially above and to one side of the axis of pivot for pivoting the motor towards and away from the compressor, the motor pivoting through its own weight to maintain tension on said drive belt, releasable means for preventing the motor from pivoting towards the compressor while allowing the motor to pivot away from the compressor to increase belt tension, and wherein said first base end includes a pin, wherein said means pivotally attaching the motor to said first base end includes a bracket attached to said motor and defining an opening receiving said pin whereby said bracket and the attached motor pivot on said pin, a shoe, means for retaining said shoe on said first base end adjacent said pin for limited vertical movement, and groove means on said shoe for receiving said bracket and for retaining said bracket on said pin.

14. Apparatus for mounting a compressor and a motor on an air receiving tank, as set forth in claim 13, wherein said releasable means includes a plurality of ratchet teeth on said bracket, and means on said shoe for engaging at least one of said ratchet teeth for preventing the motor from pivoting towards the compressor while allowing the motor to pivot away from the compressor.

15. Apparatus for mounting a compressor and a motor on an air receiving tank, as set forth in claim 14, wherein said means on said shoe for engaging at least one of said ratchet teeth comprise a plurality of teeth on the interior of said groove means

* * * * *